United States Patent [19]

Grey et al.

[11] 4,387,605
[45] Jun. 14, 1983

[54] METHOD AND APPARATUS FOR MOUNTING AN AUTOMOTIVE AUXILIARY TRANSMISSION

[76] Inventors: James S. Grey, Box 107A, East Otto, N.Y. 14029; R. Daniel Stuart, 230 S. Central Ave., Springville, N.Y. 14141; Edwin D. Lake, Zoar Valley Rd., Springville, N.Y. 14140

[21] Appl. No.: 209,017

[22] Filed: Nov. 21, 1980

[51] Int. Cl.³ ............... F16M 13/00; B60K 17/00; F16H 37/08
[52] U.S. Cl. ........................ 74/694; 248/590; 248/609; 180/70 P
[58] Field of Search ............ 74/694; 267/57.1 A, 267/57.1 R; 248/590, 609; 180/70 R, 70 P

[56] References Cited

U.S. PATENT DOCUMENTS

| 1,338,383 | 4/1920 | Lovell | 180/70 R |
| 3,584,857 | 6/1971 | Hipsher | 267/57.1 R |
| 4,002,327 | 1/1977 | Damon | 267/57.1 A |

FOREIGN PATENT DOCUMENTS

| 20438 | of 1906 | United Kingdom | 180/70 R |
| 428173 | 7/1934 | United Kingdom | 267/57.1 A |
| 734419 | 8/1955 | United Kingdom | 267/57.1 R |

*Primary Examiner*—Rodney H. Bonck
*Assistant Examiner*—D. Wright
*Attorney, Agent, or Firm*—Bean, Kauffman & Bean

[57] ABSTRACT

An improved method and apparatus for supporting an auxiliary transmission unit between the drive shaft and the differential pinion shaft via the rear universal joint, including a bracket assembly mounted to the casing of the transmission unit and to a preloading resilient device mounted to each of the drive axle housings; such pretensioning device including a resilient material sleeve having one portion immovably fixed to the bracket assembly and another portion immovably supported by the drive axle housings, the bracket assembly being tightened to the resilient sleeve in a position whereat the drive shaft is raised with respect to the differential pinion shaft and to the drive axle housings whereby as the same is lowered with respect thereto a torsional bias is induced in the resilient member which is transmitted to the bracket assembly to provide an upward, lifting force to the auxliary transmission unit.

11 Claims, 5 Drawing Figures

METHOD AND APPARATUS FOR MOUNTING AN AUTOMOTIVE AUXILIARY TRANSMISSION

SUMMARY OF THE INVENTION

The present invention relates to auxiliary or "add-on" transmission devices, such as overdrives or the like; and, more particularly, to a method and apparatus for mounting, supporting and coupling such devices to a vehicle drive shaft between the two universal joints connecting the transmission and the differential.

In the installation of auxiliary transmission or overdrive units in a position between the front and rear universal joints, it is important that the weight of the device does not overly burden the pinion shaft bearings of the differential, that the device does not adversely affect the operating relationship of the universal joints, and that the casing for the device is properly supported to adequately resist the normal operating torques produced by the drive train.

It is, accordingly, a characterizing feature of the present invention to provide a method and apparatus for mounting auxiliary transmissions or overdrives in such a manner that the gravity or weight forces thereof acting upon the pinion shaft bearings of the differential are significantly reduced, if not entirely eliminated; while, at the same time, providing a structure that is compact, inexpensive and easy to install in a relatively quick and efficient fashion.

It is a further feature of the present invention to provide an auxiliary transmission or overdrive device that is rigidly mounted to a shortened main drive shaft to serve, in effect, as a physical extension thereof to thereby maintain the same freedoms of motion of the universal joints as existed prior to the installation of such device; while also permitting the mounting or support assembly therefor to withstand, without damage thereto or to the auxiliary transmission or overdrive device, sudden heavy loadings as might be caused by roadway bumps, pot-holes or the like.

More specifically, the apparatus of the present invention incorporates a bracket or support assembly that attaches at one end to the casing of the auxiliary transmission or overdrive and at the other end to the drive axle housings; whereat the attachment being made by means which include preloading devices to provide an upward, lifting force on the casing of the auxiliary transmission or overdrive to thereby relieve the differential pinion shaft bearings of the burden of supporting substantially the entire weight thereof. In the preferred form of the invention, such preloading or bias devices each comprise a resilient material sleeve secured to the drive axle housing to which sleeve the other end of the bracket is fixedly secured for movement about the axis thereof; the bracket being affixed and securely tightened to the sleeve in an abnormal or inoperative position of the drive shaft whereat the same is inclined upwardly with respect to the axis of the differential pinion shaft and the transverse axis of the drive axle housings whereby as the drive shaft is brought to its normal or operative position, torsional or twisting internal stresses are developed within the sleeve, which stresses produce a countertorque that is transmitted through the bracket to the casing of the auxiliary transmission or overdrive to generate thereagainst an upward, lifting force.

Essentially, then, the apparatus of the present invention provides in a vehicle power train including a longitudinal main drive shaft; a differential pinion shaft, a differential housing at least partially enclosing the pinion shaft and transverse drive axle housings extending from opposite sides of the differential housing; an auxiliary transmission having an input shaft rigidly coupled to the main drive shaft for rotation therewith, an output shaft coupled to the differential pinion shaft, via a universal joint, for rotation therewith, a gear train coupling the input and output shafts, and a casing enclosing the gear train and mounting the input and output shafts for rotational movement with respect thereto; the improvement of an assembly for supporting the auxiliary transmission casing, comprising; a bracket assembly including a pair of spaced legs each removably affixed at one end to the casing and extending therefrom for respective removable attachment to the drive axle housings, and means for removably attaching each of the other ends of the legs to the drive axle housings, such means including a resilient member having one portion fixedly mounted to its respective leg for exerting a substantially upward biasing force thereagainst about an axis that is substantially parallel to that of the drive axle housings so as to essentially support the weight of the auxiliary transmission.

The method according to the present invention provides an improved technique for mounting the casing of an auxiliary transmission unit between the main drive shaft and the differential, including the steps of; raising the drive shaft with respect to the differential, rigidly securing the input shaft of the unit to the main drive shaft, coupling the output shaft of the unit to the differential pinion shaft, via a universal joint, attaching a support device between the casing of the auxiliary transmission unit and the drive axle housings by means of a resilient member fixedly secured to the drive axle housings and fixedly secured to the support device for movement therewith about an axis substantially parallel to the axis of the drive axle housings, and lowering the main drive shaft with respect to the differential to cause such resilient member to exert a biasing torque against the support device whereby the support device transmits a substantially upward, lifting force to the auxiliary transmission unit.

BRIEF DESCRIPTION OF THE DRAWINGS

For a fuller understanding of the present invention reference should now be had to the following detailed description thereof taken in conjunction with the accompanying drawings, wherein.

DETAILED DESCRIPTION OF THE PREFERRED EMBODIMENT

Figure 1:
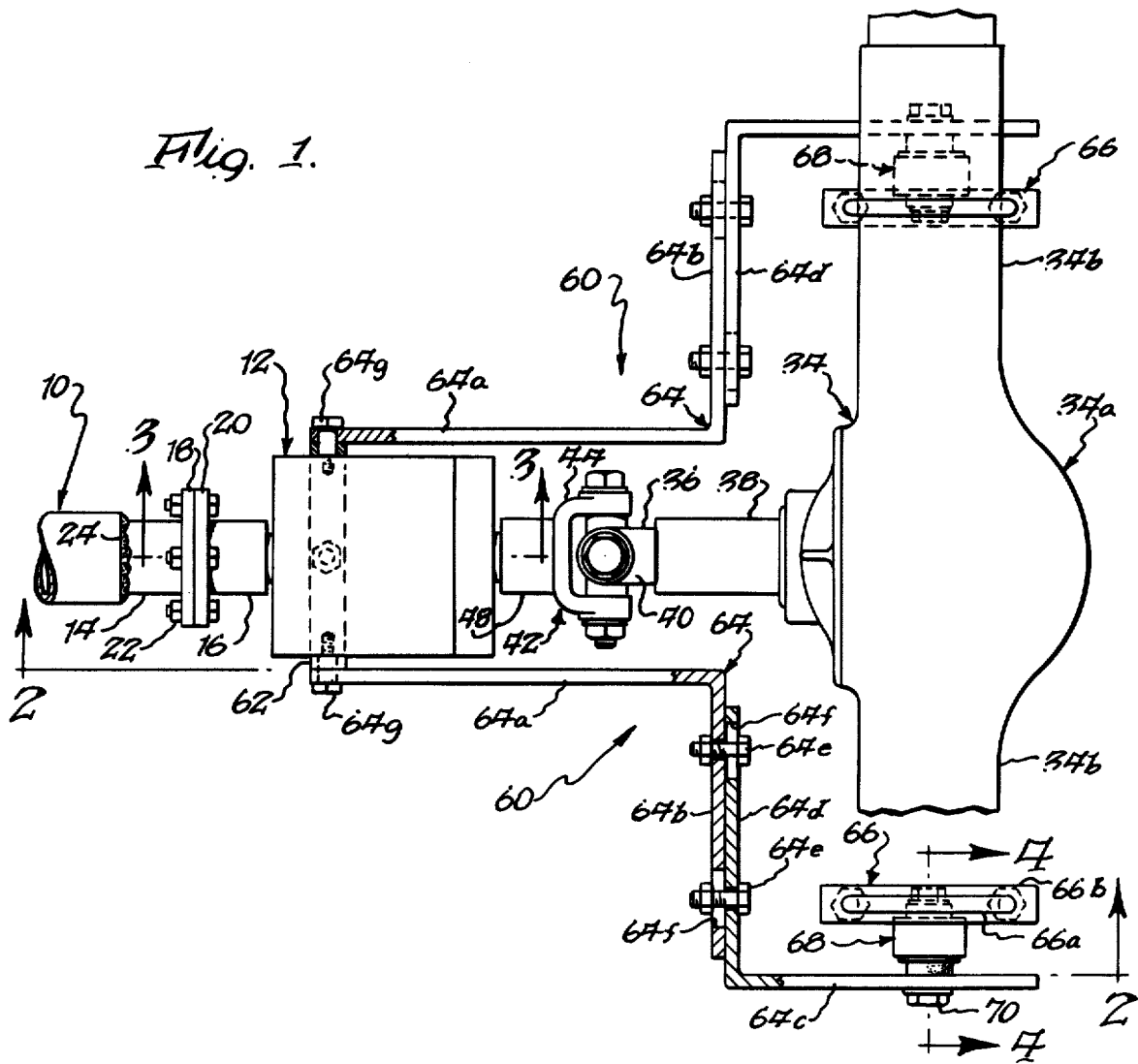
FIG. 1 is a top plan view of the auxiliary transmission support device of the invention, depicting the same in its installed position.
Figure 2:
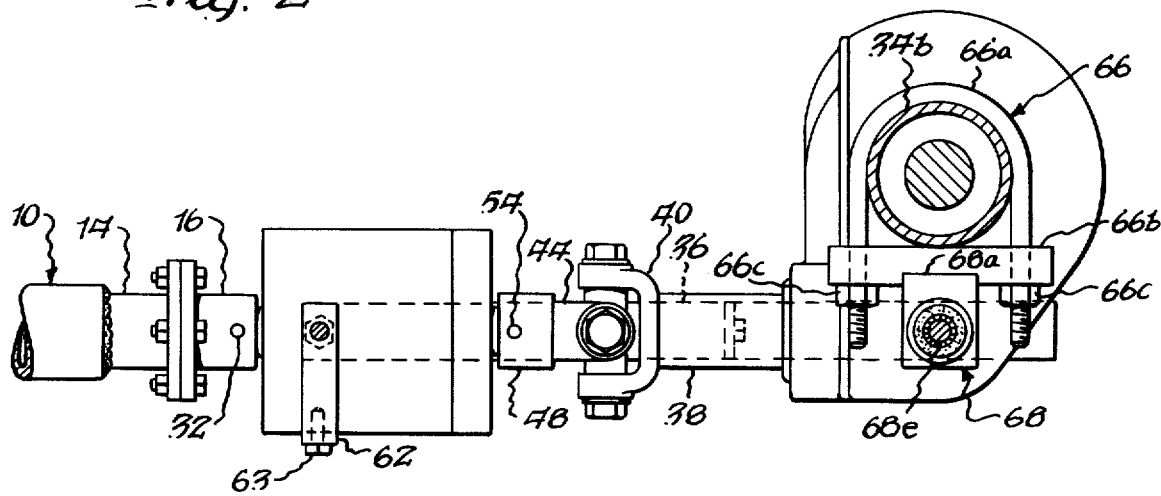
FIG. 2 is an elevational view taken along line 2—2 of FIG. 1.

Referring in detail to the drawings, a preferred form of the present invention is illustrated in its operative relationship with so much of a vehicular power train as is necessary to fully understand the invention's characterizing features and advantageous results. Thus, an automotive main drive shaft 10 connecting at one end through a universal joint J to a main transmission T (FIGS. 5 and 6) is removably affixed at its other end to an auxiliary transmission or overdrive unit, generally depicted at 12, by means of a pair of coupling or connecting members 14 and 16 of generally cylindrical construction. Connecting members 14 and 16 are provided with flanged ends 18 and 20 in removable abutting engagement by bolt devices 22. The other end of coupling member 14 is suitably secured to main drive shaft 10 by weldments 24 or the like. Drive shaft 10 is of generally conventional construction but is slightly shortened in longitudinal extent to accommodate the length of unit 12 and coupling members 14 and 16. Longitudinal or axial extension and retraction of drive shaft 10 is permitted, in conventional fashion, by means of a splined slip joint S depicted in FIGS. 5 and 6. It is to be understood that connecting member 14 can be secured to a preexisting drive shaft by simply shortening or cutting the same to the proper length and affixing the same to member 14. In this case, member 14 could be provided with a plurality of circumferentially stepped exterior diameter sections of reducing size to accommodate various driveshafts of differing dimensions. Alternatively, a new, shortened drive shaft can be provided with the mounting and support assembly of the present invention. In any event, once installed the unit 12 becomes a rigid extension of the main drive shaft.

Figure 3:
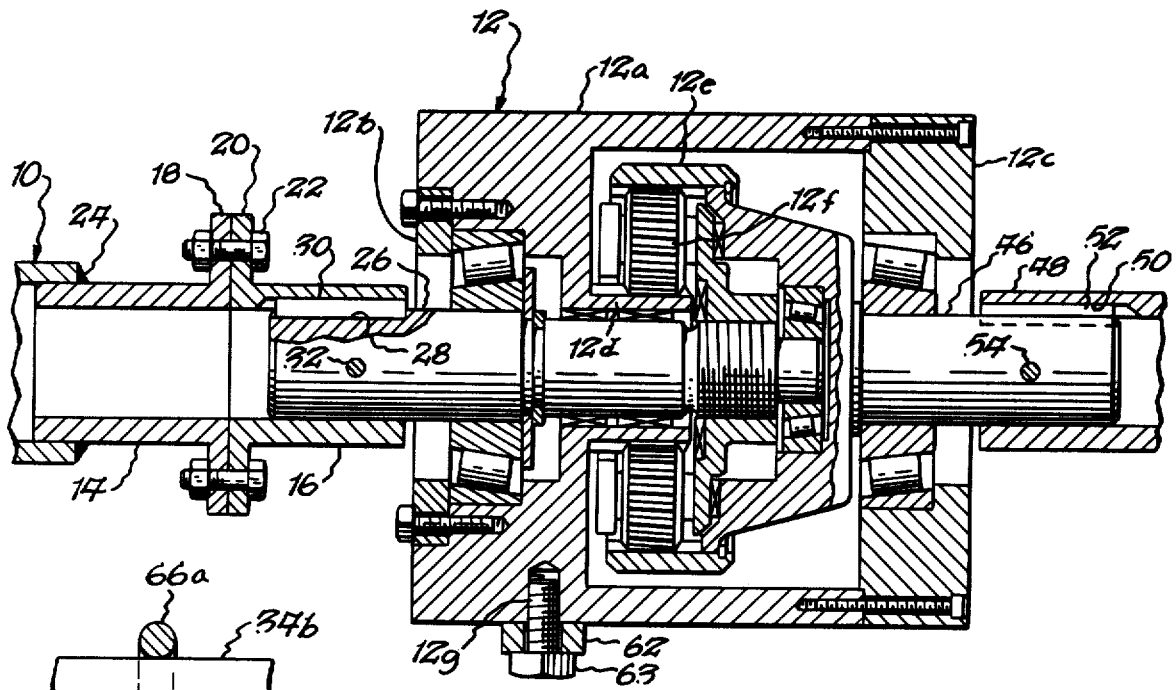
FIG. 3 is a cross-sectional view of the auxiliary transmission taken substantially along line 3—3 of FIG. 1.

As more clearly seen in FIG. 3, coupling member 16 may be secured for rotation with the input shaft 26 of unit 12 by means of mating engagement between an internal longitudinal keyway or slot 28 in member 16 and a coacting external rib or spline 30 extending longitudinally of input shaft 26. A steel roll pin 32 or the like passes transversely through aligned openings in member 16 and in input shaft 26 to securely fasten the two for rotation together and to prevent any relative longitudinal or axial movement therebetween. At its output end, unit 12 is coupled to a differential 34 of conventional construction. More specifically, the pinion shaft 36 of differential 34 passes through a pinion shaft housing 38 extending longitudinally of the differential housing 34a and is affixed to the yoke 40 of a universal joint 42; the other yoke 44 of which being affixed to the output shaft 46 of unit 12 by means of a coupling or connecting member 48, of cylindrical construction. Referring again to FIG. 3, the connection between member 48 and output shaft 46 is accomplished by mating engagement between an internal longitudinal keyway or slot 50 in member 48 and a coacting, external longitudinal rib or spline 52 on output shaft 46. A steel roll pin 54 or the like passes transversely through aligned openings in member 48 and in output shaft 46 to securely fasten the two for rotation together and to prevent any relative longitudinal movement therebetween.

Unit 12 may comprise any well known auxiliary transmission or over drive device, but is depicted in FIG. 3, for illustrative purposes only, as an overdrive unit of the type wherein the internal gear train thereof is always in the overdrive position. Accordingly, unit 12 includes a tubular casing 12a closed at each end by end plates 12b and 12c. Casing 12a encloses an internal gear train comprising a stationary sun gear 12d centrally fixed to the casing, an annular ring gear 12e in spaced surrounding relationship to sun gear 12d and suitably fixed for rotation with output shaft 46 passing through end plate 12c, and a planetary gear set 12f in mating engagement between the sun gear and the ring gear and suitably fixed for rotation with input shaft 26, passing through end plate 12b. In as much as the specific details of the overdrive unit form no specific part of the present invention, no further detailed description thereof is deemed necessary. Alternatively, unit 12 may comprise a variable overdrive unit of the type disclosed in prior U.S. Pat. No. 4,182,202.

Differential housing 34a connects, respectively, on opposite sides to each of a pair of transversely extending drive axle housings 34b which are disposed in surrounding relation to each wheel driving axle, in conventional fashion. It is to be understood that drive axle housings 34b may be formed as an integral part of the differential housing; therefore, as used herein the term "drive axle housing" is intended to include the differential housing as well. According to the teachings of the present invention an improved support assembly, generally depicted at 60, is provided between the overdrive casing 12a and the axle housings 34b to support the casing and to provide an upward, lifting force thereagainst to counterbalance the weight thereof. Assembly 60 includes a curved saddle or strap 62 affixed to the undersurface of casing 12a; support means in the form of a pair of compound arm devices 64 removably connected at one end of each through the saddle to casing 12a; clamping means in the form of a pair of axle housing clamping devices 66; and a pair of preloading or bias means 68 coupling the other ends of the compound arm devices to their respective clamping devices for limited resilient movement of the arm devices about an axis that is substantially parallel to the axis of the axle housings 34b.

Saddle 62 surrounds casing 12a in cradling relation and is securely bolted to a plurality of circumferentially oriented internally threaded casing openings 12g by a corresponding number of bolts 63. Each compound arm 64 includes an inner L-shaped bracket having a longitudinal leg 64a and an outwardly extending transverse leg 64b; and an outer L-shaped bracket having an outer longitudinal leg 64c and an inwardly extending transverse leg 64d. The transverse legs 64b, 64d of each bracket are securely affixed together in abutting relation by bolts 64e to prevent any pivotal movement therebetween. The transverse spacing of legs 64b and 64d may be suitably varied by the provision of at least one slot 64f in each in alignment with corresponding openings in the other at the bolted connection therebetween, as depicted in FIG. 1. The longitudinal legs 64a of each inner bracket are secured to casing 12a on opposite sides thereof in substantial coplanar alignment with the axial center of drive shaft 10 by a pair of aligned bolts 64g passing through openings in saddle 62 and in mating engagement with internally threaded openings in the casing. As depicted in FIG. 1, the shanks of these bolts are non-threaded smooth cylindrical surfaces to permit some pivotal movement between the legs and the casing under heavy load conditions as may be encountered by the vehicle due to roadway bumps, potholes and the like. It should be understood, however, that in normal operation the connection between the legs and the casing is sufficiently tight to resist pivotal movements therebetween.

Each clamping device 66 includes an inverted U-shaped clamping bracket 66a; the bight of which straddling its respective axle housing 34b and the legs of which being provided with externally threaded ends slidably received through aligned openings in a rectangular cross-sectioned cross bar 66b. Nuts 66c are suitably provided to draw the bight of bracket 66a and the cross bar 66b into clamping immovable engagement with the axle housings 34b.

Figure 4:
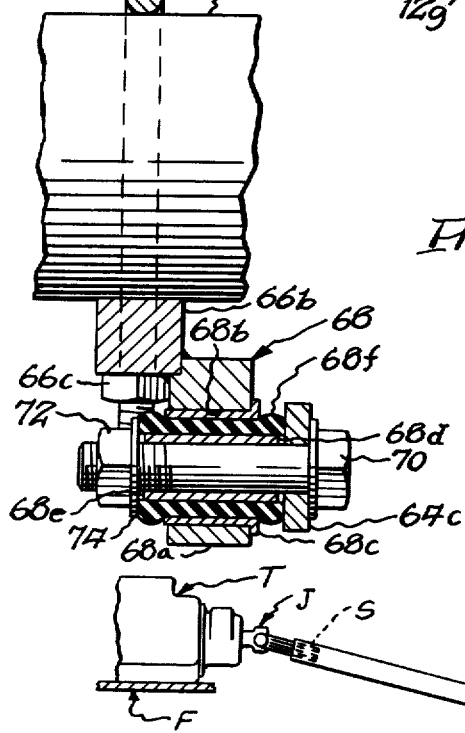
FIG. 4 is a cross-sectional view of the drive axle housing bracket and the preloading device taken substantially along line 4—4 of FIG. 1.

As best seen in FIG. 4, each preloading means 68 comprises a substantially rectangular body section 68a depending centrally from cross bar 66b and immovably affixed thereto as by welding or, alternatively, as by being integrally cast therewith. Section 68a includes a central transverse throughbore 68b; the axis of which being substantially parallel to the axis of the drive axles and the drive axle housings 34b. An outer flanged sleeve 68c may be press-fitted into throughbore 68b for no relative movement therebetween. A reduced diameter inner clamping sleeve 68d is spaced radially inwardly of outer sleeve 68c in coaxial relation therewith and with throughbore 68b. Sleeve 68d is provided with a pair of ends containing clamping teeth or serrations 68e which project longitudinally outwardly of bore 68b. Resilient means 68f in the form of an annular elastomeric member is preferably molded or suitably bonded in place between inner sleeve 68d and outer sleeve 68b. Means 68f may be fabricated of any suitable elastomeric material such as rubber; and having an outer surface which immovably adheres to the inner surface of sleeve 68c and an inner surface that adheres to the outer surface of clamping sleeve 68d. It should be understood that any relative rotary or pivotal movement between these two sleeves will produce internal torsional or twisting stresses within means 68f thereby creating a reactive torsional bias directed in opposition to the torque creating such torsional stresses.

The outer longitudinal leg 64c of each outer L-shaped bracket is clamped, intermediate the ends thereof, to respective preloading means 68 such that any pivotal movement of the bracket about the axis of throughbore 68b will produce such internal torsional stresses within resilient means 68f. To this end, a suitable bolt device 70 is slidably received within clamping sleeve 68c and passes through an aligned opening in bracket leg 64c. A tightening nut 72 draws the bracket leg into engagement with the serrations 68e for biting into the leg and securely locking the same to the clamping sleeve; the serrations 68e on the opposite end of the clamping sleeve being forced into locking engagement with a washer 74 engaged by nut 72 to span the throughbore 68b.

Figure 5:
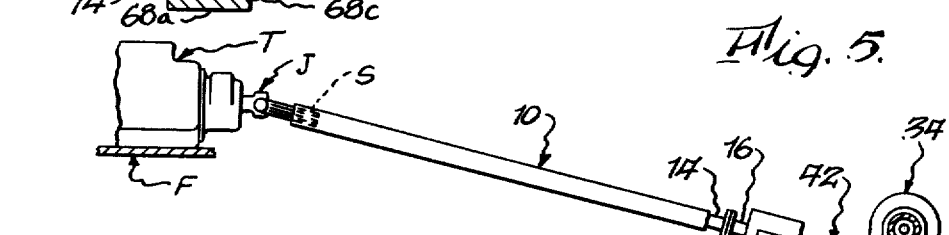
FIG. 5 is a schematic view of the relationship between the drive shaft, the auxiliary transmission and the differential in the installation position of the bracket assembly of the invention.
Figure 6:
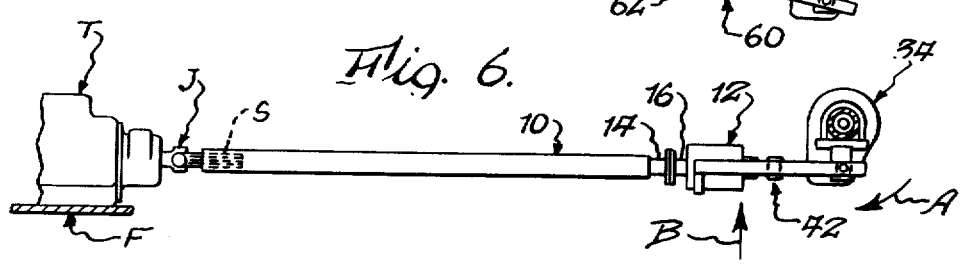
FIG. 6 is a schematic view similar to FIG. 5 depicting the drive shaft, the auxiliary transmission and the differential in their relatively normal operative positions after the bracket assembly has been installed.

In accordance with the method of the present invention the bracket assembly 60 is installed in such a manner as to produce a counterclockwise (as viewed in FIGS. 5 and 6) internal twist or torque in resilient means 68f about the axis of throughbore 68b and about an axis substantially parallel to the transverse axis of each drive axle whereby a clockwise (as viewed in FIGS. 5 and 6) torque, reactive thereto, is generated against the bracket assembly to produce an upward, lifting force against casing 12a to counterbalance substantially the entire weight thereof. As schematically depicted in FIG. 5, when the frame F of a vehicle is suitably lifted by a jacking device or hydraulic lift, the drive shaft 10, the auxiliary unit 12, its casing 12a and the bracket legs 64c are raised to an abnormal position whereat the same are inclined upwardly with respect to the differential 34, the drive axle housings 34b, the clamping device 66 and the preloading means 68; these having been lowered relative to the drive shaft due to the pivotal movement of the latter in an upward direction about the rear universal joint 42 and the lowering movement of the former with the wheels of the vehicle. In this position, the unit 12 is rigidly secured to the drive shaft (either the preexisting one shortened or the new shorter one installed) by flanged connectors 18 and 20; and to the differential pinion shaft by securing yoke 40 to yoke 44 to complete the universal joint 42. The bracket legs are secured to respective opposed sides of casing 12a, the clamping devices 66 are securely tightened about their respective drive axle housings 34b, and the bracket legs 64c are then clamped to their respective clamping sleeve serrations 68e by tightening of nuts and bolts 72 and 70. When the vehicle is lowered to its normal, ground engaging position, depicted schematically in FIG. 6, the bracket legs 64 are pivoted counterclockwise about the axis of the throughbore 68b; however, since the bracket legs are immovably affixed to the resilient means 68f by clamping sleeve 68d, such counterclockwise movement causes the resilient means to twist counterclockwise (still as viewed in FIG. 6) whereby an internal, clockwise torque or bias is produced therein as depicted by arrow A. This bias applies a torque to the bracket assembly about the axis of throughbore 68b which causes the same to transmit an upward, lifting force to the casing 12a, as depicted by arrow B, to thereby essentially counterbalance the weight of the auxiliary overdrive unit 12. Thus, the pinion shaft bearings of the differential are unburdened by the weight of the auxiliary transmission or overdrive unit.

Although a preferred embodiment of the present invention has been disclosed and described, changes will obviously occur to those skilled in the art. It is therefore intended that the present invention is to be limited only by the scope of the appended claims.

We claim:

1. In a vehicle power train including a longitudinal main drive shaft; a differential having a pinion shaft, a differential housing at least partially enclosing said pinion shaft and drive axle housings transversely extending from opposite sides of said differential housing; an auxiliary transmission having an input shaft rigidly coupled to said main drive shaft for rotation therewith, an output shaft coupled to said pinion shaft, via a universal joint, a gear train coupling said input and output shafts, and a casing enclosing said gear train and mounting said input and output shafts for rotational movement with respect thereto; the improvement of an assembly for supporting said casing, comprising:

a bracket assembly including a pair of spaced legs, removably affixed at one of their ends to said casing and extending therefrom for respective removable attachment at their other ends to said drive axle housings; and means for removably attaching each of said other ends of said spaced legs to its respective one of said drive axle housings, said means including a resilient member having one portion fixedly mounted to its respective drive axle housing and another portion fixedly secured to its respective leg for exerting an upward, lifting force thereagainst to essentially counterbalance the weight of said auxiliary transmission.

2. The improvement according to claim 1, wherein:
said means further includes a clamping device fixedly mounted on its respective drive axle housing, and said resilient member is fixedly mounted to said clamping device for exerting said lifting force about an axis that is substantially parallel to the axis of said drive axle housings.

3. The improvement according to claim 2, wherein:
said means further includes an outer sleeve rigidly fixed to said clamping device and an inwardly spaced inner sleeve received within said outer sleeve and rigidly fixed to its respective leg; and
said resilient member comprises an elastomeric material having an outer surface fixedly secured to said outer sleeve and an inner surface fixedly secured to said inner sleeve.

4. The improvement according to claim 3, wherein:
said inner sleeve includes serrated ends projecting axially through said outer sleeve; and
said serrated ends are clamped in abutting, immovable engagement with its respective leg.

5. The improvement according to claim 4, wherein:
said means further includes a substantially rectangular cross-sectioned member depending from said clamping device and provided with a throughbore; and wherein
said outer sleeve is immovable received within said throughbore.

6. The improvement according to claim 1, wherein:
said means further includes a clamping device fixedly mounted on its respective drive axle housing, a body section depending from said clamping device having a central throughbore, an inwardly spaced inner sleeve received within said throughbore and having at least one serrated end projecting axial therethrough;
said resilient member is located between said inner sleeve and said throughbore in coaxial relation therewith, said one portion of said resilient member is immovably supported within said throughbore by said body section, said other portion of said resilient member is immovably affixed to said inner sleeve; and
said serrated end is clamped in abutting, immovable engagement with its respective leg.

7. The improvement according to claim 6, wherein:
each of said spaced legs includes an inner substantially L-shaped bracket having a longitudinal leg and a transverse outer leg and an outer substantially L-shaped bracket having an outer longitudinal leg and an inwardly extending transverse leg, the transverse legs of each of said brackets are securely affixed together in abutting and immovable relation, the longitudinal leg of said inner bracket is affixed to said casing and the longitudinal leg of said outer bracket is clamped to said inner sleeve.

8. The improvement according to claim 7, wherein:
said longitudinal leg of said inner bracket is affixed to said casing by means permitting pivotal movement therebetween in response to heavy load forces.

9. An auxiliary transmission unit and support therefor; comprising:
an auxiliary transmission unit including a casing, an input shaft rotatably mounted with respect to said casing adapted for rigid connection at one end to a vehicle drive shaft, an output shaft rotatably mounted with respect to said casing adapted for universal connection at one end to the differential pinion shaft of a vehicle, an internal gear train surrounded by said casing and coupled between the other ends of said input and output shafts;
support means affixed at one end to said casing;
clamping means adapted to rigidly engage the drive axle housings of a vehicle; and
preloaded bias means for connecting said support means to said clamping means and for establishing a torque tending to counterbalance the weight of said auxiliary transmission unit.

10. In a vehicle power train including a longitudinal main drive shaft; a differential having a pinion shaft, a differential housing at least partially enclosing said pinion shaft and drive axle housings transversely extending from opposite sides of said differential housing; an auxiliary transmission having an input shaft rigidly connected to said main drive shaft for rotation therewith, an output shaft coupled to said pinion shaft, via a universal joint, a gear train coupling said input and outputs shafts, and a casing enclosing said gear train and mounting said input and output shafts for rotational movement with respect thereto; an improved method for supporting said auxiliary transmission, comprising the steps of:
lifting said main drive shaft with respect to said differential housing to create an angular relationship between the two about said universal joint;
attaching a support device between said auxiliary transmission casing and said drive axle housings by means of a resilient member fixedly secured to said drive axle housings and fixedly secured to said support device for movement therewith about an axis substantially parallel to the axis of the drive axle housings; and
lowering said drive shaft with respect to said differential housing to cause said resilient member to exert a biasing torque against said support device about said first mentioned axis whereby said support device transmits a substantially upward, lifting force to said auxiliary transmission.

11. A method of installing an auxiliary transmission unit in a vehicle between a main drive shaft and a pinion shaft of a differential having drive axle housings extending transversely therefrom via a rear universal joint, said auxiliary transmission unit having input and output shafts, a gear train for coupling said input and output shafts and a casing enclosing said gear train and mounting said input and output shafts for rotation relative thereto, said method comprising the steps of:
lifting said vehicle to raise said main drive shaft with respect to said pinion shaft;
removing said main drive shaft and selectively shortening the same to define or replacing the same with a shortened drive shaft to accommodate the length of said auxiliary transmission unit;
rigidly attaching said input shaft of the auxiliary transmission unit to said shortened drive shaft;
coupling said output shaft of said auxiliary transmission unit to said pinion shaft by connecting the same to said rear universal joint;
securing a support device to said casing of said auxiliary transmission unit;
fastening a clamping device to said drive axle housings;

rigidly connecting one portion of a resilient preloading device to said support device for pivotal movement therewith about an axis substantially parallel to the axis of said drive axle housings, rigidly connecting an other portion of said preloading device to said clamping device; and lowering said vehicle to its normal ground engaging position whereby said preloading device is loaded to provide a biasing force on said casing of said auxiliary transmission unit via said support device to exert an upward, lifting force thereagainst to substantially counterbalance the weight thereof.

* * * * *